US012306049B2

(12) United States Patent
Miksanek et al.

(10) Patent No.: US 12,306,049 B2
(45) Date of Patent: May 20, 2025

(54) HIGH TEMPERATURE SENSOR HOUSING WITH THERMOCOUPLE CONNECTORS, AND METHOD FOR MANUFACTURING THE SAME

(71) Applicant: Vitesco Technologies GmbH, Regensburg (DE)

(72) Inventors: Otakar Miksanek, Munich (DE); Tomas Buzek, Munich (DE); Ales Filipec, Munich (DE); Petr Marecek, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 354 days.

(21) Appl. No.: 17/839,259

(22) Filed: Jun. 13, 2022

(65) Prior Publication Data
US 2022/0397462 A1 Dec. 15, 2022

(30) Foreign Application Priority Data

Jun. 14, 2021 (EP) ..................................... 21179311

(51) Int. Cl.
*G01K 7/02* (2021.01)
*H01R 13/426* (2006.01)
*H01R 43/20* (2006.01)

(52) U.S. Cl.
CPC ........... *G01K 7/023* (2013.01); *H01R 13/426* (2013.01); *H01R 43/20* (2013.01)

(58) Field of Classification Search
CPC .... H01R 43/20; H01R 13/518; H01R 13/427; H01R 13/4364; H01R 13/6397; G01K 7/023
See application file for complete search history.

(56) References Cited

U.S. PATENT DOCUMENTS 7,029,328 B1\* 4/2006 Mckenzie .......... H01R 13/5221
439/587
7,641,502 B2\* 1/2010 Itou .................... H01R 13/4364
439/383

(Continued)

FOREIGN PATENT DOCUMENTS

CN  108011199 A  5/2018  ............... G01K 7/02
EP  0 732 775    9/1996   ........... H01R 13/627

(Continued)

OTHER PUBLICATIONS

Search Report for EP Application No. 21179311.2, 11 pages, Dec. 3, 2021.

(Continued)

*Primary Examiner* — Marcus E Harcum
(74) *Attorney, Agent, or Firm* — Slayden Grubert Beard PLLC

(57) ABSTRACT

Various embodiments of the teachings herein include a connector assembly comprising: a housing; a connector housing integrally formed as part of the housing; an aperture integrally formed as part of the connector housing; a wire assembly including a wire connector having a housing portion located in the aperture, the wire connector connected to the connector housing via a first connection; and a locking element connected to the connector housing via a second connection. The first connection prevents the wire connector from becoming detached from the connector housing and the second connection prevents the locking element from becoming detached from the connector housing.

13 Claims, 9 Drawing Sheets

(56) References Cited

U.S. PATENT DOCUMENTS

| | | | |
|---|---|---|---|
| 8,011,942 B2 * | 9/2011 | Ohmori | H01R 13/6315 |
| | | | 439/352 |
| 10,090,613 B2 * | 10/2018 | Choi | H01R 13/518 |
| 10,153,598 B2 | 12/2018 | Watanabe et al. | |
| 10,756,485 B2 * | 8/2020 | Ohfuku | H01R 13/6275 |
| 11,108,193 B2 * | 8/2021 | Kanemura | H01R 12/51 |
| 11,189,963 B2 * | 11/2021 | Kawashima | H01R 13/516 |
| 2017/0222358 A1 * | 8/2017 | Hashimoto | H01R 13/424 |
| 2018/0331452 A1 * | 11/2018 | Iida | H01R 13/4223 |
| 2019/0260149 A1 * | 8/2019 | Masada | H01R 13/518 |
| 2019/0312394 A1 * | 10/2019 | Paynter | H01R 13/518 |
| 2021/0242638 A1 * | 8/2021 | Saito | H01R 13/447 |
| 2022/0173545 A1 * | 6/2022 | Ishikawa | H01R 13/506 |

FOREIGN PATENT DOCUMENTS

| | | | |
|---|---|---|---|
| EP | 2 207 242 | 7/2010 | H01R 13/631 |
| EP | 3 168 942 | 5/2017 | H01R 13/52 |
| EP | 3 479 087 | 3/2021 | G10K 1/10 |
| FR | 3 053 465 | 1/2018 | G01K 1/10 |
| WO | WO-2013156378 A1 * | 10/2013 | H01R 13/4223 |
| WO | WO-2013162590 A1 * | 10/2013 | H01R 13/6272 |
| WO | 2020 193597 | 10/2020 | G01K 7/02 |

OTHER PUBLICATIONS

Indian Office Action, Application No. 202234017772, 3 pages, Mar. 7, 2024.

Indian Office Action, Application No. 202234017772, 5 pages, Mar. 17, 2023.

* cited by examiner

HIGH TEMPERATURE SENSOR HOUSING WITH THERMOCOUPLE CONNECTORS, AND METHOD FOR MANUFACTURING THE SAME

CROSS-REFERENCE TO RELATED APPLICATIONS

This application claims priority to EP Application No. 21179311.2 filed Jun. 14, 2021, the contents of which are hereby incorporated by reference in their entirety.

TECHNICAL FIELD

The present disclosure relates generally to high temperature sensors. Various embodiments include a sensor with a housing with thermocouple connectors, and methods for manufacturing the same, especially to a connector assembly for a housing which is part of a temperature sensor assembly.

BACKGROUND

Temperature sensors are commonly used for many different applications. Typically, temperature sensors include one or more lead wires which are connected to a sensing probe. The lead wire is also attached to a connector, and the connector is in electrical communication with an ECU of a vehicle. There exists a need for a temperature sensor having a connector which is more securely connected to one or more lead wires, and tampering with the temperature sensor is detectable with physical or visual inspection. An example of a temperature sensor is known in FR 3 053 465, titled "Protective Casing For A Temperature Sensor In A Vehicle." Another example of a temperature sensor is WO 2020/193597, titled "Protective Casing For A Vehicle Temperature Sensor."

SUMMARY

The teachings of the present disclosure include high temperature sensor housings with thermocouple connectors, and method for manufacturing the same, and more specifically to a connector assembly for a housing which is part of a temperature sensor assembly. For example, some embodiments include a connector assembly, comprising: a housing (12); a connector housing (28) integrally formed as part of the housing (12); at least one aperture (30a,30b,30c) integrally formed as part of the connector housing (28); a wire assembly (32a) including a wire connector (38) having a housing portion (46) being located in the at least one aperture (30a,30b,30c) of the connector housing (28), the wire connector (38) being connected to the connector housing (28) via a first connection; and a locking element (58) connected to the connector housing (28) via a second connection; wherein the first connection prevents the wire connector (38) from becoming detached from the connector housing (28), and the second connection prevents the locking element (58) from becoming detached from the connector housing (28).

In some embodiments, there is at least one through-aperture (62a, 62b, 62c) integrally formed as part of the locking element (58); and during assembly of the connector assembly, the wire connector (38) is in a first position and moved through the at least one through-aperture (62a,62b, 62c) such that the wire connector (38) moves through the locking element (58), and the wire connector (38) is rotated to a second position and then inserted into the at least one aperture (30a,30b,30c) until the wire connector (38) is connected to the connector housing (28) by the first connection.

In some embodiments, during assembly of the connector assembly, the wire connector (38) is in the first position and moved transversely along an axis (70a) through the at least one through-aperture (62a,62b,62c), and the wire connector (38) is rotated about the axis (70a) to the second position and then inserted into the at least one aperture (30a,30b,30c).

In some embodiments, the wire connector (38) is rotated about the axis (70a) to change from the first position to the second position, and then inserted into the at least one aperture (30a,30b,30c)

In some embodiments, the wire connector (38) is rotated about the axis (70a) in a range from about 70° to about 110°, from about 80° to about 100°, or about 90°.

In some embodiments, there is a cavity (78) formed in the locking element (58) and during assembly of the connector assembly, the locking element (58) is moved towards the connector housing (28) such that the connector housing is inserted into the cavity (78), and the locking element (58) is connected to the connector housing (28) by the second connection.

In some embodiments, there is at least one locking flange (64a,64b,64c,64d,64e,64f) integrally formed as part of the locking element (58); an outer flange (48) integrally formed as part of the housing portion (46); and the outer flange (48) is in contact with the at least one locking flange (64a,64b, 64c,64d,64e,64f) when the locking element (58) is connected to the connector housing (28), and prevents the wire connector (38) from becoming disconnected from the connector housing (28).

In some embodiments, there is at least one locking protrusion (50) integrally formed as part of the housing portion (46); and at least one receiving aperture (54) integrally formed as part of the connector housing (28); and the first locking protrusion (50) at least partially extends into the receiving aperture (54) to provide the first connection.

In some embodiments, there is at least one outer locking tab (68a,68b,68c,68d,68e,68f) integrally formed as part of the locking element (58); at least one locking tab (56a,56b) integrally formed as part of the connector housing (28); and the at least one locking tab (56a,56b) in contact with the at least one outer locking tab (68a,68b,68c,68d,68e,68f), to provide the second connection.

In some embodiments, there is at least one guide wall (66a,66b,66c,66d) integrally formed as part of and located inside the locking element (58); and a shroud portion (28a,28b,28c) integrally formed as part of the connector housing (28), the at least one aperture (30a,30b,30c) integrally formed as part of the shroud portion (28a,28b,28c); and the shroud portion (28a,28b,28c) is adjacent to the at least one guide wall (66a,66b,66c,66d) when the locking element (58) is connected to the connector housing (28).

In some embodiments, the first connection is releasable.

In some embodiments, the second connection is permanent.

In some embodiments, there is a circumferential flange (74) integrally formed as part of the locking element (58); and an inner circumferential flange (76) integrally formed as part of the connector housing (28); and damage to the circumferential flange (74) or the inner circumferential flange (76) provides an indication that the connector assembly has been tampered with.

As another example, some embodiments include a method directed to assembling a connector assembly, comprising: providing a housing (12); providing a connector housing (28) integrally formed as part of the housing (12); providing at least one aperture (30a,30b,30c) integrally formed as part of the connector housing (28); providing a wire assembly (32a); providing a wire connector (38) being part of the wire assembly (32a), the wire connector (38) having a housing portion (46); providing a locking element (58) connected to the connector housing (28), the locking element (58) having a cavity (78); and providing at least one through-aperture (62a,62b,62c) integrally formed as part of the locking element (58); placing the wire connector (38) in a first position; moving the wire connector (38) through the at least one through-aperture (62a,62b,62c) such that the wire connector (38) moves through the locking element (58) along a longitudinal axis (70a); rotating the wire connector (38) to a second position; connecting the wire connector (38) to the connector housing (28) by a first connection, by inserting the wire connector (38) into the at least one aperture (30a,30b,30c); inserting the connector housing (28) into the cavity (78) by moving the locking element (58) towards the connector housing (28); and connecting the locking element (58) is the connector housing (28) by a second connection.

BRIEF DESCRIPTION OF THE DRAWINGS

The teachings of the present disclosure will become more fully understood from the detailed description and the accompanying drawings, wherein.

DETAILED DESCRIPTION

Figure 1:
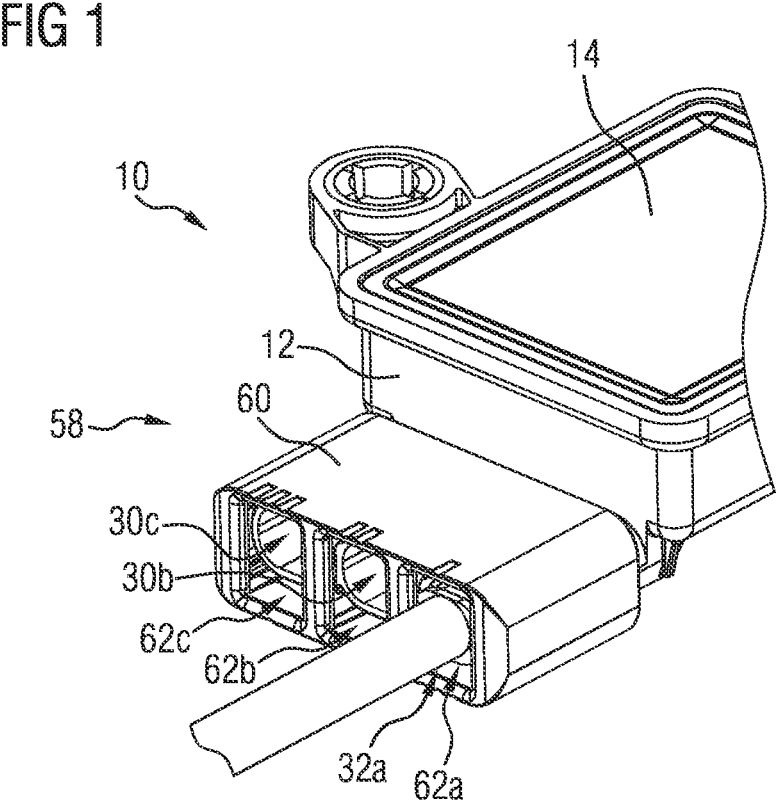
FIG. 1 is a perspective view of a portion of a temperature sensor assembly incorporating teachings of the present disclosure.
Figure 2:
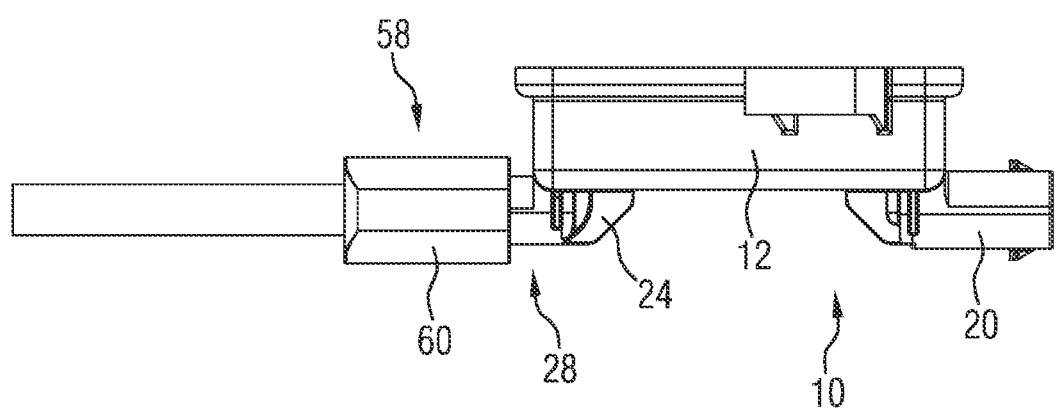
FIG. 2 is a side view of a temperature sensor assembly incorporating teachings of the present disclosure.
Figure 3:
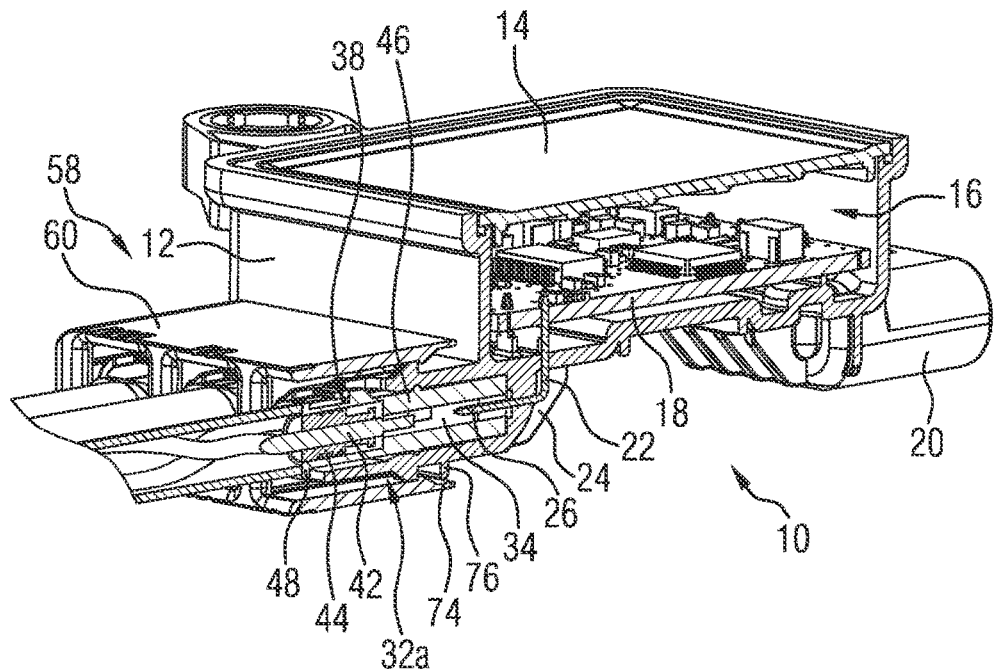
FIG. 3 is a perspective sectional view of a portion of a temperature sensor assembly incorporating teachings of the present disclosure.
Figure 4:
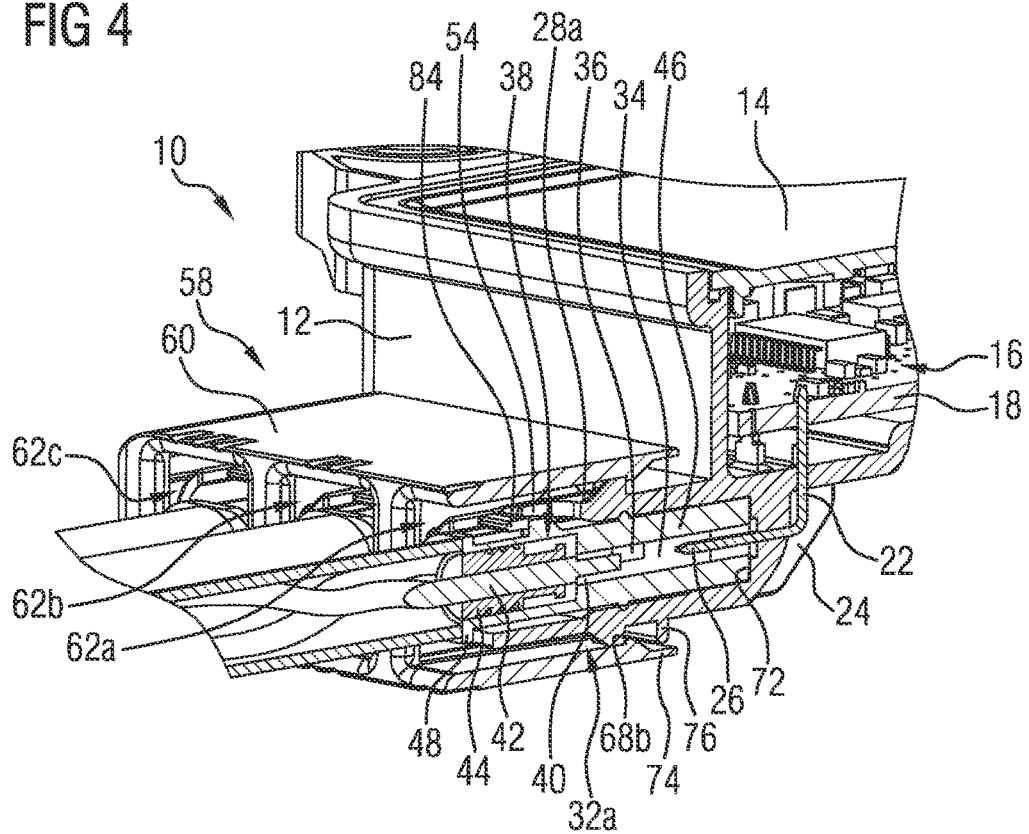
FIG. 4 is an enlarged perspective sectional view of a portion of a temperature sensor assembly incorporating teachings of the present disclosure.
Figure 5:
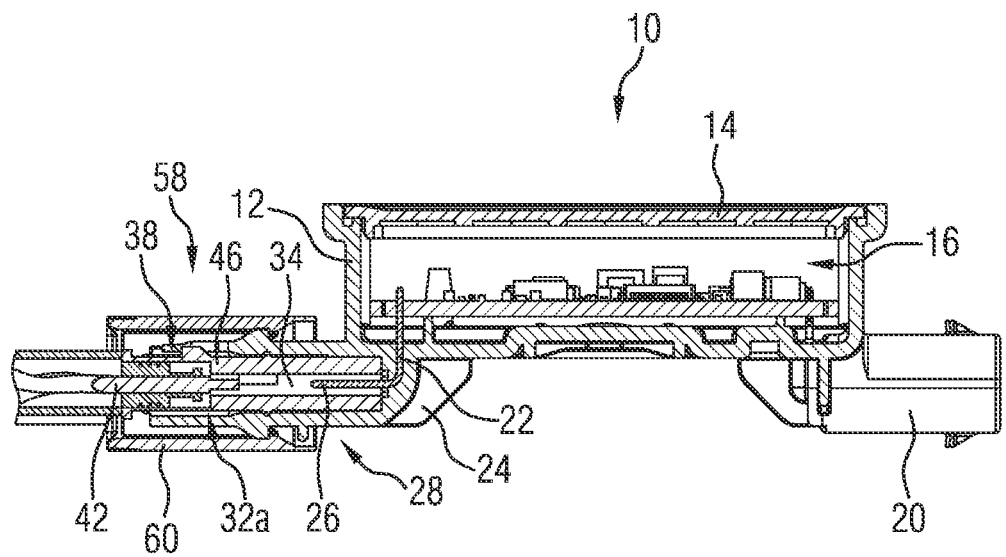
FIG. 5 is a sectional side view of a portion of a temperature sensor assembly incorporating teachings of the present disclosure.

In some embodiments, there is a connector assembly which has at least two connections, and may have three connections, for preventing disassembly. The connector assembly has several wire assemblies, and each of the wire assemblies is connected to a housing by a first connection, which may be a snap fit, or interference fit, type of connection. A locking element is also connected to the housing by a second connection, which may also be a snap fit, or interference, type of connection. Once the locking element is attached to the housing, the wire assemblies and the locking element may not be removed without causing catastrophic damage to the components of the connector assembly. In some embodiments, the wire assemblies are abutted against the locking element when the locking element is connected to the housing, such that when a pulling force is applied to one or more of the wire assemblies, the pulling force is distributed between the first connection, the second connection, and the locking element receiving force from one or more of the wire assemblies.

In some embodiments, a connector assembly for a temperature sensor assembly, has a housing, a connector housing integrally formed as part of the housing, at least one aperture integrally formed as part of the connector housing, a wire assembly including a wire connector having a housing portion being located in the at least one aperture of the connector housing, the wire connector being connected to the connector housing via a first connection, and a locking element connected to the connector housing via a second connection. The first connection prevents the wire connector from becoming detached from the connector housing, and the second connection prevents the locking element from becoming detached from the connector housing.

In some embodiments, the connector assembly also includes at least one through-aperture integrally formed as part of the locking element. During assembly of the connector assembly, the wire connector is in a first position and moved through the through-aperture such that the wire connector moves through the locking element, and the wire connector is rotated to a second position and then inserted into the aperture until the wire connector is connected to the connector housing by the first connection.

In some embodiments, during assembly of the connector assembly, the wire connector is in the first position and moved transversely along an axis through the through-aperture, and the wire connector is rotated about the axis to the second position and then inserted into the aperture.

In some embodiments, the wire connector is rotated about the axis to change from the first position to the second position, and then inserted into the at least one aperture. In some embodiments, the wire connector is rotated about the axis in a range from about 70° to about 110°, from about 80° to about 100°, or about 90°.

In some embodiments, the connector assembly includes a cavity formed in the locking element. During assembly of the connector assembly, the locking element is moved towards the connector housing such that the connector housing is inserted into the cavity of the locking element, and the locking element is connected to the connector housing by the second connection.

In some embodiments, at least one locking flange is integrally formed as part of the locking element, and an outer flange is integrally formed as part of the housing portion. The outer flange is in contact with the at least one locking flange when the locking element is connected to the connector housing, and prevents the wire connector from becoming disconnected from the connector housing.

In some embodiments, at least one locking protrusion is integrally formed as part of the housing portion, and at least one receiving aperture is integrally formed as part of the connector housing. The first locking protrusion at least partially extends into the receiving aperture to provide the first connection.

In some embodiments, at least one outer locking tab is integrally formed as part of the locking element, and at least one locking tab is integrally formed as part of the connector housing. The at least one locking tab in contact with the at least one outer locking tab, to provide the second connection.

In some embodiments, at least one guide wall is integrally formed as part of and located inside the locking element, and a shroud portion is integrally formed as part of the connector housing, where the aperture integrally formed as part of the shroud portion. The shroud portion is adjacent to the at least one guide wall when the locking element is connected to the connector housing.

In some embodiments, the first connection is releasable. In some embodiments, the second connection is permanent.

In some embodiments, a circumferential flange is integrally formed as part of the locking element, and an inner circumferential flange is integrally formed as part of the connector housing. Any damage to the circumferential flange or the inner circumferential flange provides an indication that the connector assembly has been tampered with.

In some embodiments, the first connection also functions as a first abutment area, and the second connection also functions as a second abutment area. The outer flange of the wire assembly being in contact with the locking flange of the locking element functions as a third abutment area. When a pulling force is applied to the wire assembly, the force is distributed between the three abutment areas.

In some embodiments, the present invention is a method directed to assembling a connector assembly, which includes the steps of providing a housing, providing a connector housing integrally formed as part of the housing, providing at least one aperture integrally formed as part of the connector housing, providing a wire assembly, providing a wire connector being part of the wire assembly, the wire connector having a housing portion, providing a locking element connected to the connector housing, the locking element having a cavity, and providing at least one through-aperture integrally formed as part of the locking element. In an embodiment, the method of the present invention includes placing the wire connector in a first position, moving the wire connector through the at least one through-aperture such that the wire connector moves through the locking element along a longitudinal axis, rotating the wire connector to a second position, connecting the wire connector to the connector housing by a first connection, by inserting the wire connector into the at least one aperture, inserting the connector housing into the cavity by moving the locking element towards the connector housing, and the locking element is connected to the connector housing by a second connection.

It should be understood that the detailed description and specific examples are intended for purposes of illustration only and are not intended to limit the scope of the disclosure. The following description of the depicted embodiments is merely exemplary in nature and is in no way intended to limit the scope of the disclosure, its application, or uses.

Figure 11:
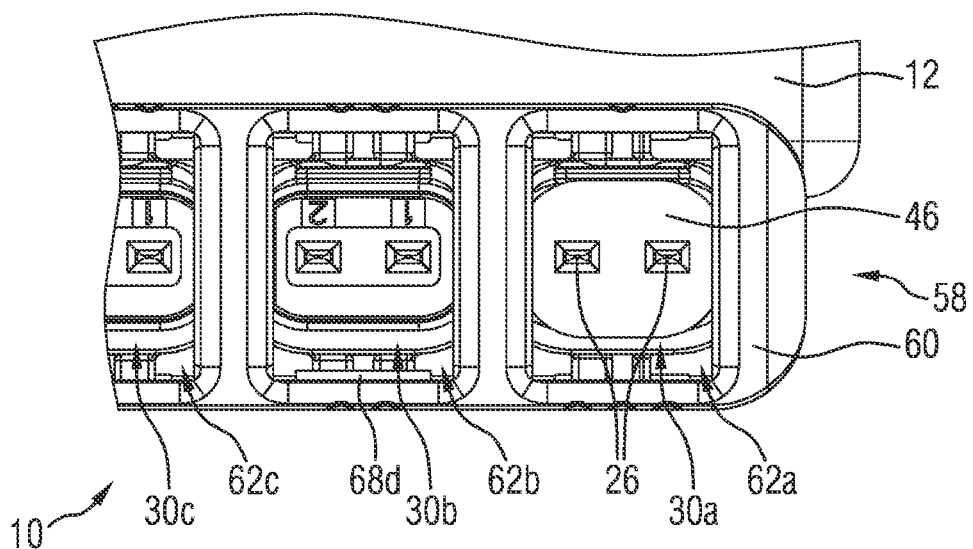
FIG. 11 is a rear sectional view of a portion of a temperature sensor assembly incorporating teachings of the present disclosure.

Referring to the Figs. generally, an embodiment of a temperature sensor having a connector assembly is shown generally at 10. The temperature sensor assembly 10 includes a housing 12, a cover 14, and a cavity, shown generally at 16, located in the housing 12. Mounted in the cavity 16 is a printed circuit board (PCB) 18, with various circuitry mounted to the PCB 18. The circuitry is in electrical communication with a connector that is surrounded by a shroud 20. Extending through the PCB 18 is a plurality of pins 22, each of which are L-shaped. The pins 22 extend through a rib 24 integrally formed as part of the housing 12. Each of the pins 22 has an outer end 26, which extends out of the rib 24. Integrally formed as part of the housing 12 is a connector housing, shown generally at 28, and the connector housing 28 includes several shroud portions 28a,28b, 28c. Each of the shroud portions 28a,28b,28c includes an aperture 30a,30b,30c, where the outer end 26 of two of the pins 22 extends into one of the apertures 30a,30b,30c, as shown in FIG. 11. In this embodiment, there are six pins 22, and three apertures 30a,30b,30c, with an aperture 30a,30b, 30c integrally formed as part of a corresponding shroud portion 28a,28b,28c.

Referring again to FIGS. 7-9, the temperature sensor assembly 10 includes a plurality of wire assemblies, shown generally at 32a,32b,32c, the components of the wire assembly 32a is described, with the remaining wire assemblies 32b,32c having similar construction. As shown in FIGS. 3-9, the wire assembly 32a has at least one receptacle pin 34, and each receptacle pin 34 has a recessed portion 36 used for securing the receptacle pin 34 to a wire connector, shown generally at 38. The wire connector 38 is made of a molded material, such as plastic, and a portion of the wire connector 38 extends into the recessed portion 36 securing the wire connector 38 to the receptacle pin 34. Each receptacle pin 34 also has a corresponding crimping portion 40, which is used to clamp the receptacle pin 34 to a corresponding wire 42 and a portion of a corresponding single wire sealing element 44, such that each wire 42, receptacle pin 34, and single wire sealing element 44 are held together by the crimping portion 40. The receptacle pin 34 and the single wire sealing element 44 are inserted into the wire connector 38 together.

The wire connector 38 includes a housing portion 46, and the receptacle pin 34, single wire sealing element 44, and a portion of the wire 42 are located in the housing portion 46. Integrally formed as part of the housing portion 46 is an outer flange 48, also integrally formed with the housing portion 46 is a first locking protrusion 50 having an angled guide surface 82, and a sealing flange 52. When assembled, the housing portion 46 is located in the aperture 30a. Integrally formed as part of the shroud portion 28a is a receiving aperture 54. Also integrally formed on an outer surface of the shroud portion 28a is a first locking tab 56a and a second locking tab 56b. The first locking tab 56a includes an angled guide surface 88a, and the second locking tab 56b also includes an angled guide surface 88b. The other shroud portions 28b,28c also include a corresponding receiving aperture and locking tabs.

Referring again to the Figs. generally, the temperature sensor assembly 10 also includes a locking element 58. Integrally formed as part of the locking element 58 is a plurality of through-apertures, shown generally at 62a,62b, 62c, and each of the through-apertures 62a, 62b, 62c are in fluid communication with a cavity, shown generally at 78, inside the locking element 58.

Figure 10:
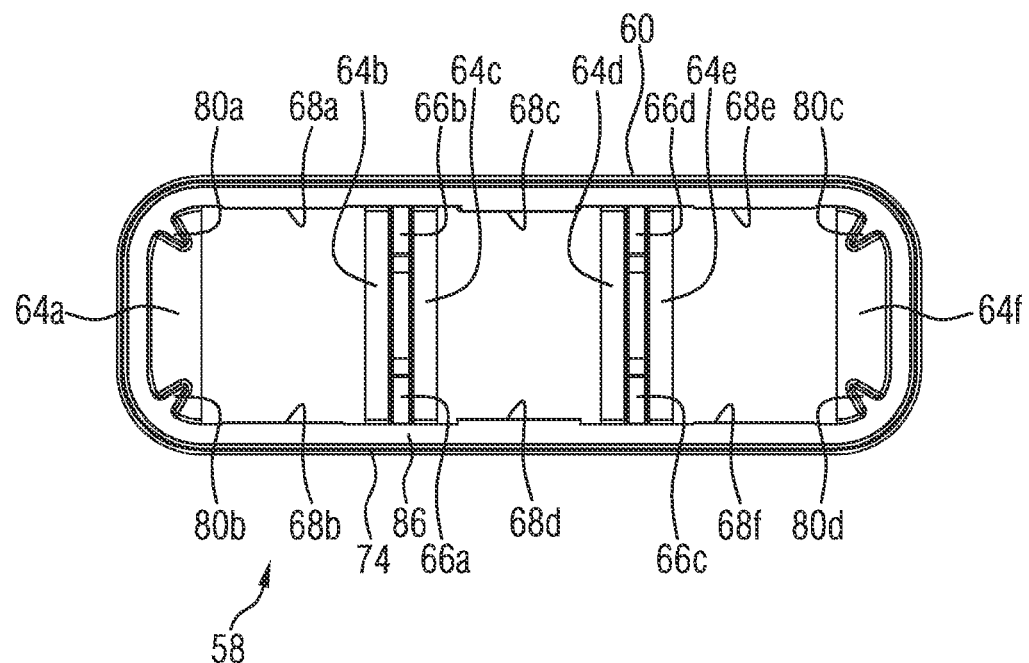
FIG. 10 is a is a rear view of a locking element which is part of a temperature sensor assembly incorporating teachings of the present disclosure.

Adjacent the through-aperture 62a, and also integrally formed as part of the locking element 58, are locking flanges. Referring to FIGS. 8-12A, a first locking flange 64a and a second locking flange 64b are adjacent one of the through-apertures 62a, and there are similar locking flanges 64c,64d,64e,64f integrally formed as part of the locking element 58 and adjacent the other through-apertures 62b, 62c. There are also several guide walls 66a,66b,66c,66d integrally formed as part of the locking element 58. The guide walls 66a,66b,66c,66d are located in the cavity 78, as shown in FIGS. 8-10 and 12A. Also integrally formed as part of the locking element 58 and located in the cavity 78 is a plurality of locking tabs, where a first outer locking tab 68a and a second outer locking tab 68b shown in the Figs. are used for securing the locking element 58 to the shroud portion 28a, and other outer locking tabs 68c,68d,68e,68f are used to connect the locking element 58 to the other shroud portions 28b,28c, respectively. The locking element 58 also includes several angled guide walls 80a,80b,80c, 80d, which are integrally formed as part of the locking element 58 and are located in the cavity 78. The outer locking tabs 68a,68b,68c,68d,68e,68f and the angled guide walls 80a,80b,80c,80d are integrally formed with a circumferential angled surface 86. The circumferential angled surface 86 circumscribes the inside of the locking element 58, as shown in FIG. 10.

Figure 12A:
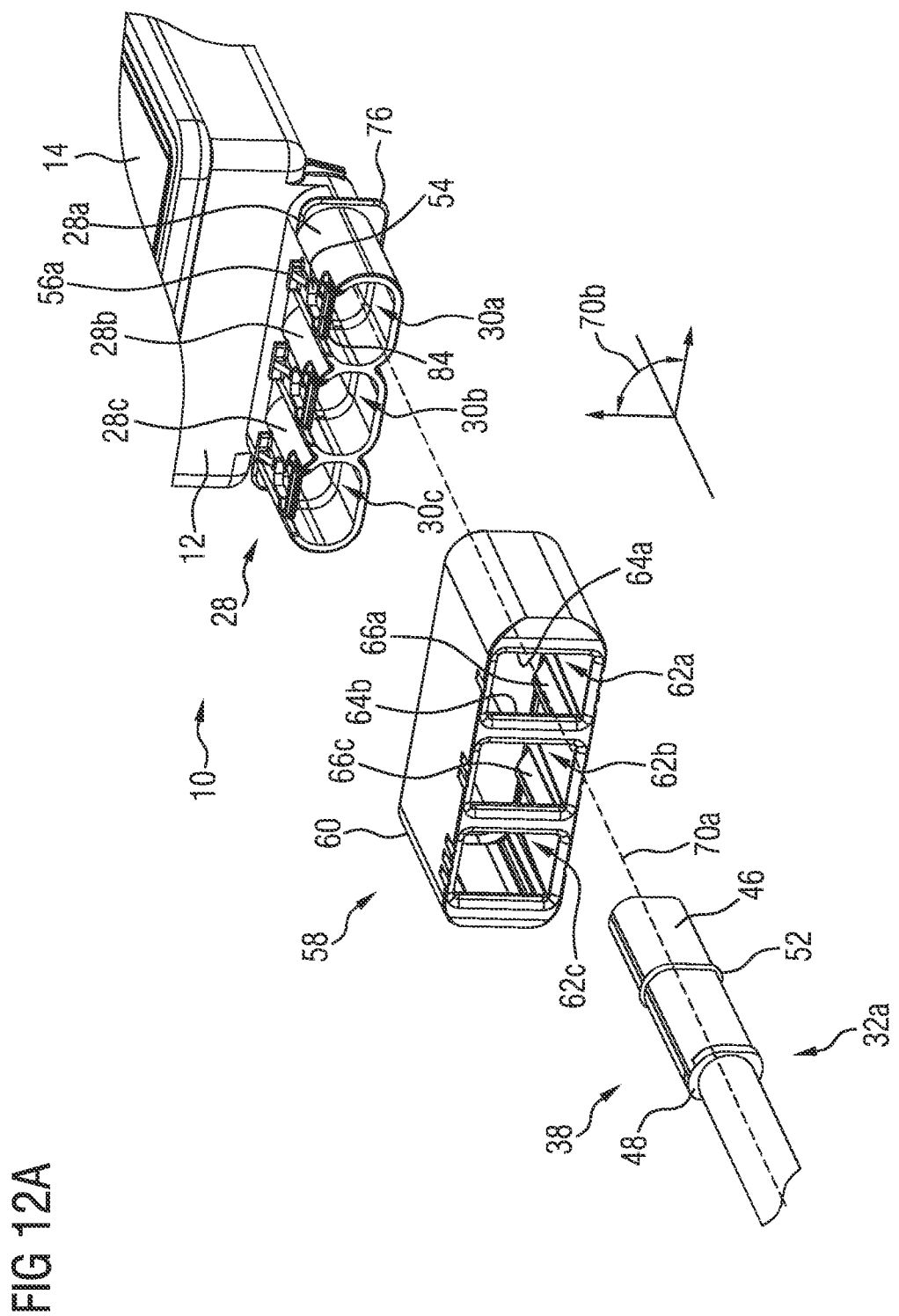
FIG. 12A is a first exploded view of a portion of a temperature sensor assembly incorporating teachings of the present disclosure.
Figure 12B:
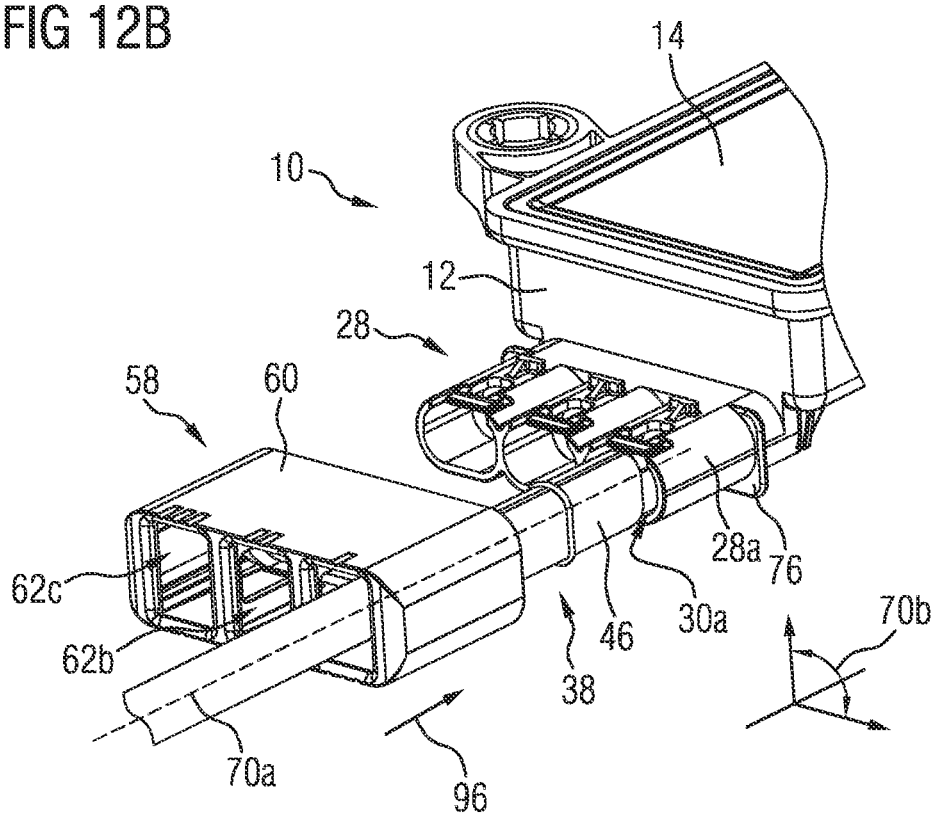
FIG. 12B is a second exploded view of a portion of a temperature sensor assembly incorporating teachings of the present disclosure.
Figure 12C:
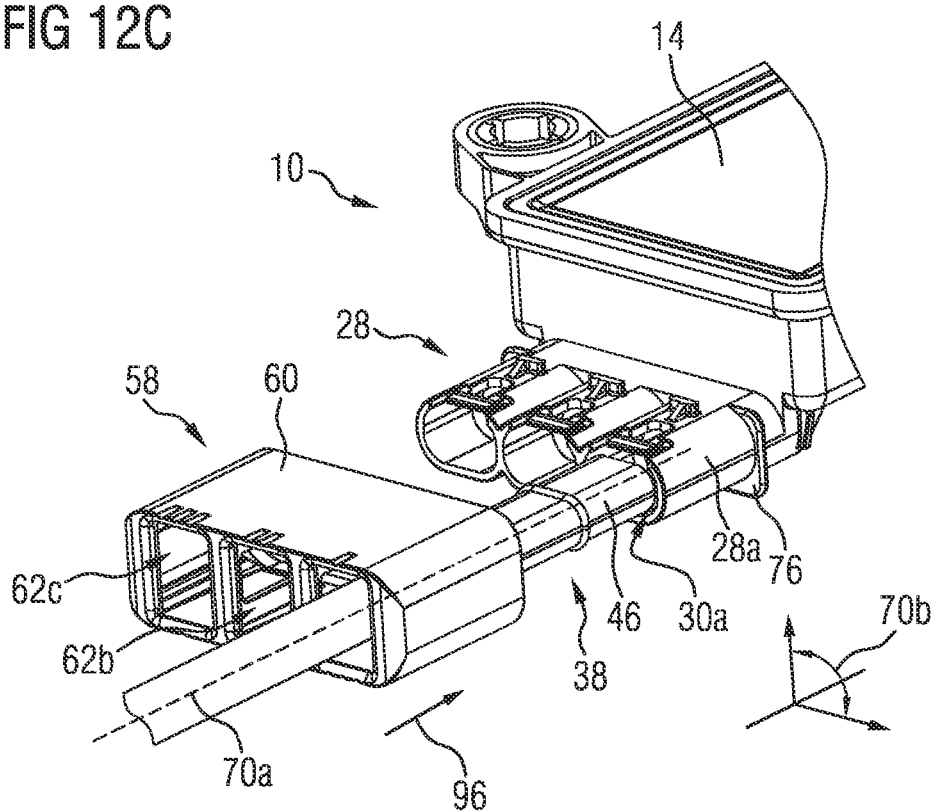
FIG. 12C is a third exploded view of a portion of a temperature sensor assembly incorporating teachings of the present disclosure.

Referring to FIG. 12A, the connection of the wire assembly 32a to the connector housing 28 is shown, with the remaining wire assemblies 32b,32c assembled to the connector housing 28 in a similar manner. During assembly of the temperature sensor assembly 10, the housing portion 46 of the wire assembly 32a is initially placed in a first position, shown in FIG. 12A. The housing portion 46 is moved transversely along an axis 70a through the aperture 62a towards the shroud portion 28a in the direction of the arrow 96, as shown in FIG. 12B. Also shown in FIG. 12B, the housing portion 46 cannot be inserted into the aperture 30a when the housing portion 46 is in the first position. The housing portion 46 is then rotated to a second position, shown in FIG. 12C. In one embodiment, the housing portion 46 is rotated an angle 70b about the axis 70a to change from the first position to the second position. The housing portion 46 is rotated clockwise when looking in the direction of the arrow 96. In one embodiment, the angle 70b is 90°.

Once the housing portion 46 is in the second position, the housing portion 46 is inserted into the aperture 30a of the shroud portion 28a. As the housing portion 46 is inserted into the aperture 30a, there is deflection of the shroud portion 28a because the angled guide surface 82 of the first locking protrusion 50 contacts an upper flange 84 of the shroud portion 28a, such that the upper flange 84 of the shroud portion 28a deflects and slides along the angled guide surface 82. As the housing portion 46 is further inserted into the aperture 30a, the upper flange 84 moves past the angled guide surface 82 and the first locking protrusion 50 then slides along the inner surface of the upper flange 84. Once the housing portion 46 is inserted into the aperture 30a such that the housing portion 46 contacts a rear wall 72 of the aperture 30a, the first locking protrusion 50 at least partially extends into the receiving aperture 54, and the deflection of the shroud portion 28a is eliminated. Additionally, the outer end 26 of the pin 22 is located in part of the receptacle pin 34, and the sealing flange 52 also contacts an inner surface of the aperture 30a to provide a sealing function.

Figure 6:
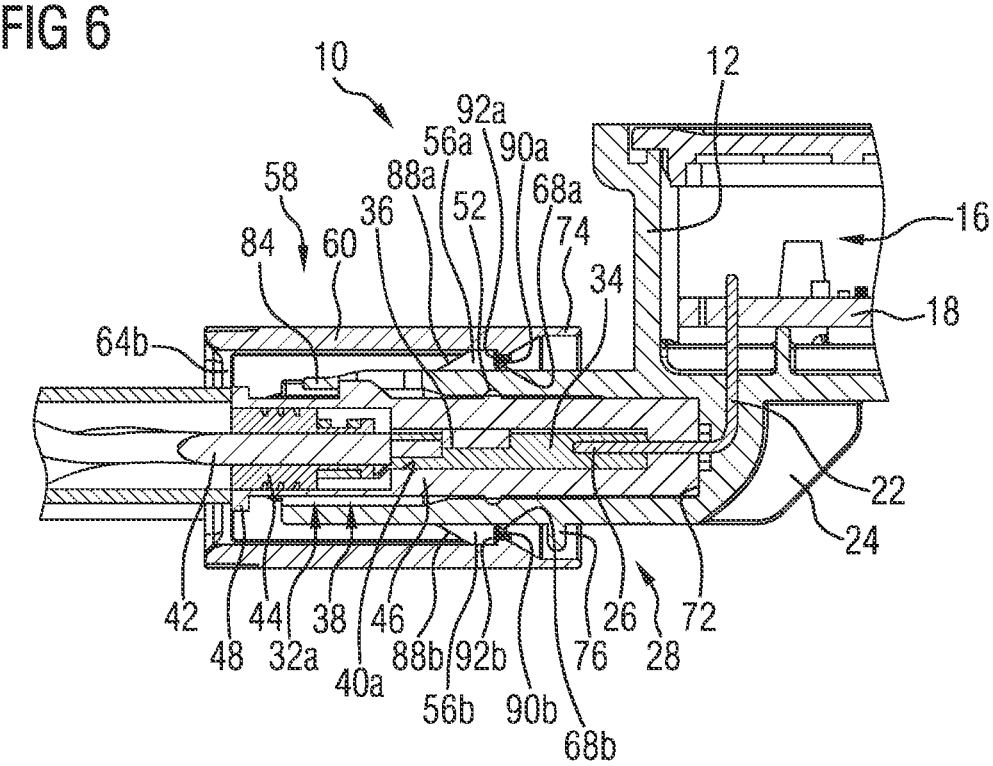
FIG. 6 is an enlarged sectional side view of a portion of a temperature sensor assembly incorporating teachings of the present disclosure.
Figure 7:
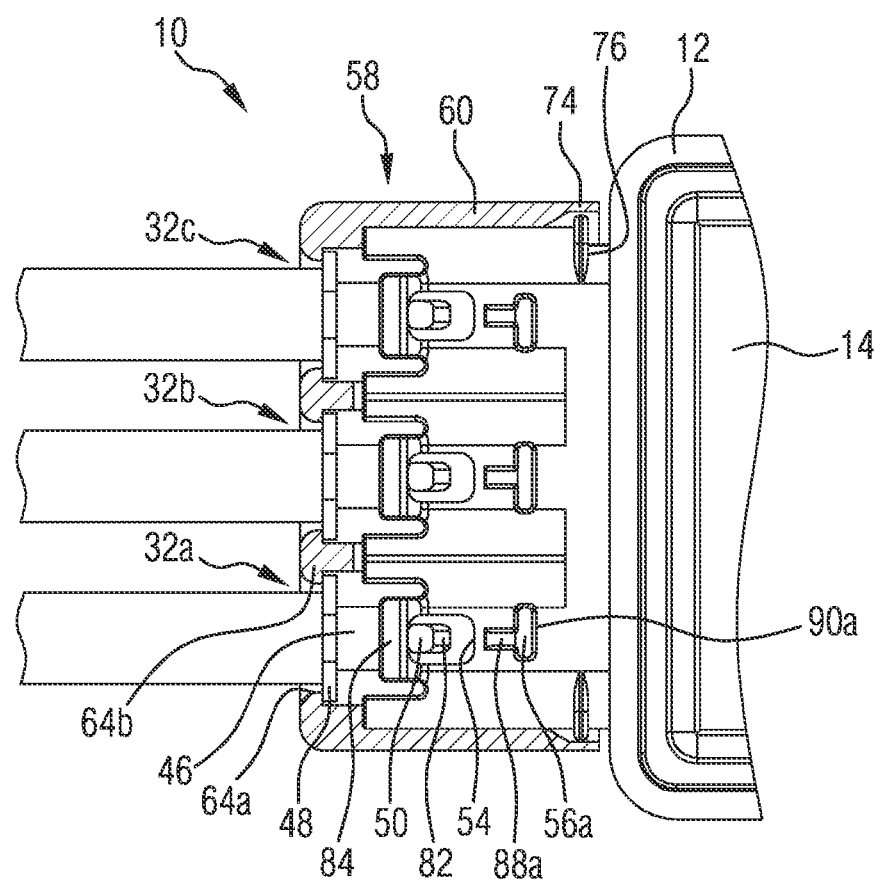
FIG. 7 is a top partial sectional view of a temperature sensor assembly incorporating teachings of the present disclosure.
Figure 8:
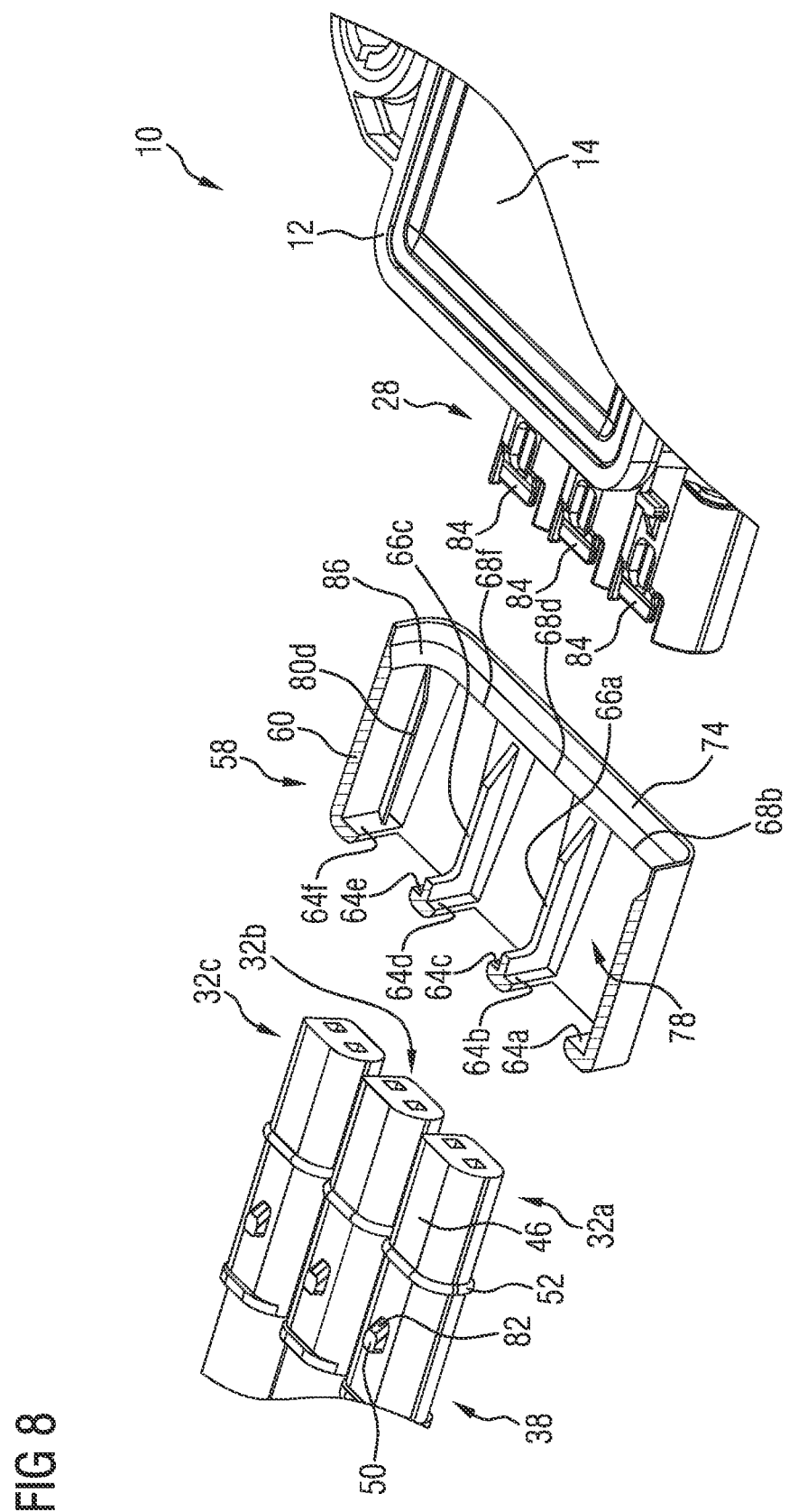
FIG. 8 is an exploded view of a temperature sensor assembly, with a locking element shown in section incorporating teachings of the present disclosure.
Figure 9:
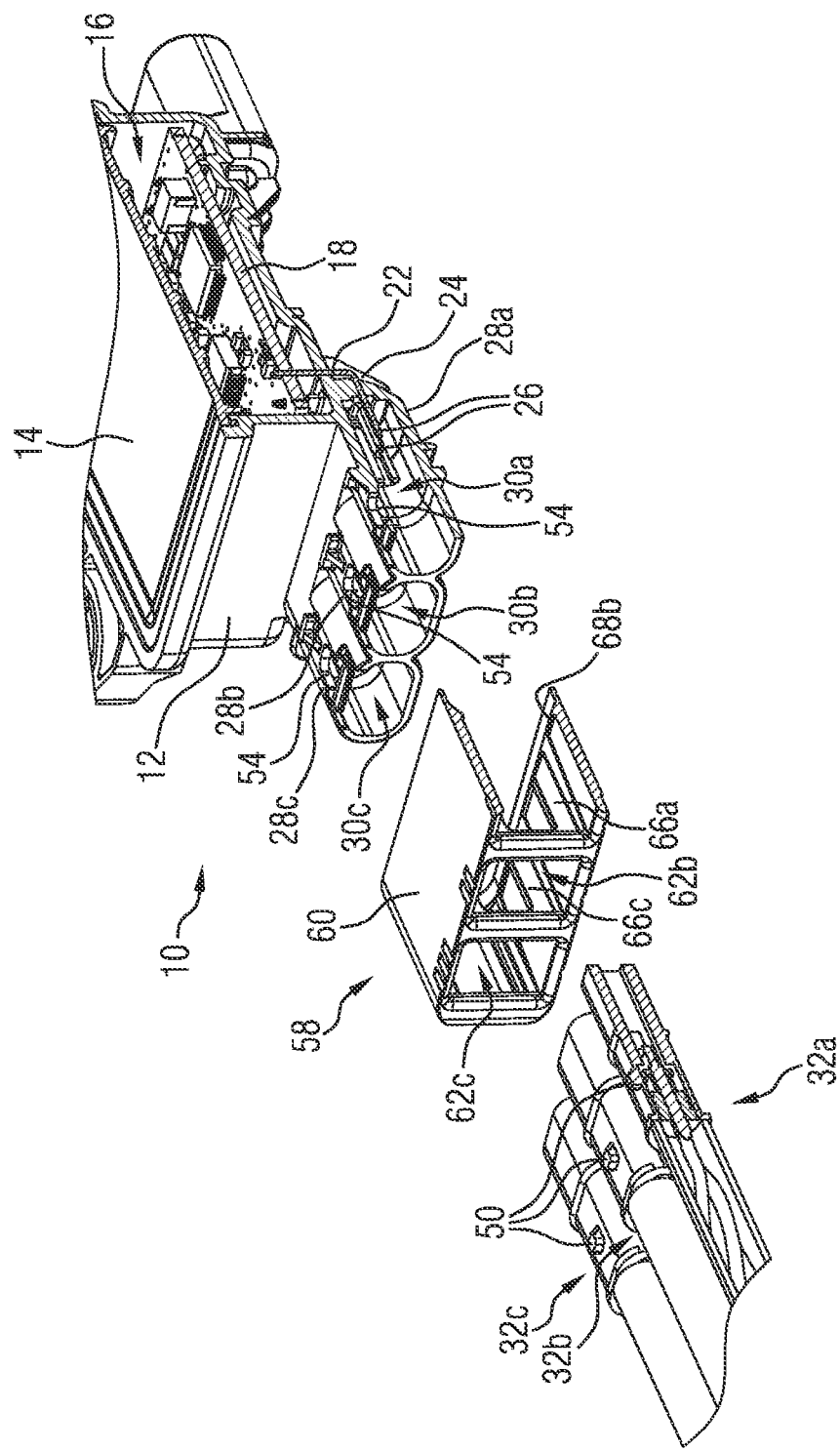
FIG. 9 is an exploded partial sectional view of a portion of a temperature sensor assembly incorporating teachings of the present disclosure.

After the housing portion 46 is inserted into the aperture 30a, the locking element 58 is moved towards the connector housing 28. The locking element 58 is moved towards the connector housing 28 such the shroud portion 28a is moved into the cavity 78, the angled guide surface 88a of the first locking tab 56a contacts the circumferential angled surface 86, and the angled guide surface 88b of the second locking tab 56b also contacts the circumferential angled surface 86. As the angled guide surface 88a and the and the angled guide surface 88b move across the circumferential angled surface 86, the locking element 58 deflects. As the locking element 58 is moved further towards the connector housing 28 such the shroud portion 28a moves further into the cavity 78, the first locking tab 56a and the second locking tab 56b move past the circumferential angled surface 86, the deflection of the locking element 58 is eliminated, a locking surface 90a of the first locking tab 56a contacts a locking surface 92a of the first outer locking tab 68a, and a locking surface 90b of the second locking tab 56b contacts a locking surface 92b of the second outer locking tab 68b, as shown in FIG. 6. This results in the locking element 58 being positioned as shown in FIGS. 1-7 and 11. The other shroud portions 28b,28c are connected to the locking element 58 in a similar manner. In the embodiment shown, the shroud portions 28a,28b,28c are substantially oval-shaped, and when the locking element 58 is attached to the connector housing 28, the guide walls 66a,66b are adjacent to the shroud portions 28a,28b, the guide walls 66c,66d are adjacent to the shroud portions 28b,28c. Also, when the locking element 58 is attached to the connector housing 28, the angled guide walls 80a,80b are in contact with the first shroud portion 28a, and the angled guide walls 80c,80d are in contact with the shroud portion 28c. The guide walls 66a,66b,66c,66d and the and the angled guide walls 80a, 80b,80c,80d guide the movement of the locking element 58 as the locking element 58 is attached to the connector housing 28.

When the locking element 58 is attached to the connector housing 28, the locking surface 90a of the first locking tab 56a is in contact with the locking surface 92a of the first outer locking tab 68a, the locking surface 90b of the second locking tab 56b in contact with the locking surface 92b of the second outer locking tab 68b, as shown in FIG. 6. Also, when the locking element 58 is attached to the connector housing 28, the outer flange 48 of the wire assembly 32a is in contact with the first locking flange 64a and the second locking flange 64b.

A first connection is provided by the first locking protrusion 50 extending into the receiving aperture 54. The first connection functions to connect the housing portion 46 to the shroud 28a of the connector housing 28. In an embodiment, the first connection is releasable. A second connection is provided by the locking surface 90a of the first locking tab 56a being in contact with the locking surface 92a of the first outer locking tab 68a, and the locking surface 90b of the second locking tab 56b being contact with the locking surface 92b of the second outer locking tab 68b. The second connection functions to connect the locking element 58 to the connector housing 28. In an embodiment, the second connection is permanent. In this embodiment, the first connection and the second connection function as an interference fit, or "snap fit" connection. However, it is within the scope of the invention that other types of connections may be used.

The first connection also functions as a first abutment area, and the second connection also functions as a second abutment area. The outer flange 48 of the wire assembly 32a being in contact with the first locking flange 64a and the second locking flange 64b functions as a third abutment area. When a pulling force is applied to the wire assembly 32a, the force is distributed between the three abutment areas, and is not distributed to the pins 22 or the PCB 18.

Once the locking element 58 is attached to the connector housing 28, the locking element 58 is prevented from becoming detached from the connector housing 28 by the second connection. The wire assembly 32a includes a sleeve member 94, and the wire 42 is surrounded by the sleeve member 94. If a force, such as a pulling force, is applied to the wire assembly 32a, more specifically the sleeve member 94 of the wire assembly 32a, in a direction away from the connector housing 28, the three abutment areas prevent the wire assembly 32a from becoming detached from the connector housing 28. This provides three areas where the force is distributed when force is applied to the wire assembly 32a. The other wire assemblies 32b,23c have similar connections and abutment areas. In one example, the pulling force on the sleeve member 94 may be the result of a person gripping and pulling on the sleeve member 94.

Once the locking element 58 is attached to the connector housing 28, because the second connection is permanent, none of the wire assemblies 32a,32b,32c may be removed without catastrophically damaging the locking element 58, the shroud portions 28a,28b,28c, or the wire assemblies 32a,32b,32c. Any damage to the locking element 58, one of the shroud portions 28a,28b,28c, or the wire assemblies 32a,32b,32c, provides an indication that the temperature sensor assembly 10 has been tampered with.

The temperature sensor assembly 10 also includes several anti-tampering features. Integrally formed as part of the locking element 58 is a circumferential flange 74. Integrally formed with the connector housing 28 is an inner circumferential flange 76. If a tool, such as a screwdriver, were used in an attempt to disconnect the locking element 58 from the connector housing 28, both the circumferential flange 74 and the inner circumferential flange 76 deflect easily, and are also easily broken such that any damage to either of the circumferential flange 74 or the inner circumferential flange 76 provides an indication that the temperature sensor assembly 10 has been tampered with.

The teachings of the present disclosure is not limited for use with the temperature sensor assembly 10 described above. The connector assemblies described herein may be used for other types of sensor or circuit assemblies as well. The connector assembly of the present invention includes at least two connections which prevent the detachment of the wire assemblies 32a,32b,32c and the locking element 58. The outer flange 48 of the wire assembly being in contact with the first locking flange 64a and the second locking flange 64b of the locking element 58 also prevents the wire assembly 32a from becoming detached from the connector housing 28. This, along with the two connections, provides three locations where pulling force applied to the sleeve member 94 is distributed, such attempting to disconnect locking element 58 or the wire assemblies 32a,32b,32c results in catastrophic damage to the temperature sensor assembly 10.

The description of the embodiments is merely exemplary in nature and, thus, variations that do not depart from the gist of the teachings are intended to be within the scope of the disclosure. Such variations are not to be regarded as a departure from the spirit and scope thereof.

The invention claimed is:

1. A connector assembly comprising:
 a housing;
 a connector housing integrally formed as part of the housing;
 an aperture integrally formed as part of the connector housing;
 a wire assembly including a wire connector having a housing portion located in the aperture, the wire connector connected to the connector housing via a first connection;
 a locking element connected to the connector housing via a second connection; and
 a through-aperture integrally formed as part of the locking element;
 wherein during assembly of the connector assembly, the wire connector is in a first position and moved through the through-aperture such that the wire connector moves through the locking element, and the wire connector is rotated to a second position and then inserted into the at least one aperture until the wire connector is connected to the connector housing by the first connection;
 wherein the first connection prevents the wire connector from becoming detached from the connector housing and the second connection prevents the locking element from becoming detached from the connector housing.

2. The connector assembly of claim 1, wherein during assembly of the connector assembly, the wire connector is in the first position and moved transversely along an axis through the at least one through-aperture, and the wire connector is rotated about the axis to the second position and then inserted into the at least one aperture.

3. The connector assembly of claim 2, wherein the wire connector is rotated about the axis to change from the first position to the second position, and then inserted into the at least one aperture.

4. The connector assembly of claim 3, wherein the wire connector is rotated about the axis in a range from about 70° to about 110°.

5. The connector assembly of claim 1, further comprising a cavity formed in the locking element;
 wherein during assembly of the connector assembly, the locking element is moved towards the connector housing such that the connector housing is inserted into the cavity, and the locking element is connected to the connector housing by the second connection.

6. The connector assembly of claim 1, further comprising:
 a locking flange integrally formed as part of the locking element; and
 an outer flange integrally formed as part of the housing portion; and
 wherein the outer flange is in contact with the locking flange when the locking element is connected to the connector housing, and prevents the wire connector from becoming disconnected from the connector housing.

7. The connector assembly of claim 1, further comprising:
 a locking protrusion integrally formed as part of the housing portion; and
 a receiving aperture integrally formed as part of the connector housing;
 wherein the first locking protrusion at least partially extends into the receiving aperture to provide the first connection.

8. The connector assembly of claim 1, further comprising:
 an outer locking tab integrally formed as part of the locking element; and
 a locking tab integrally formed as part of the connector housing;
 wherein the locking tab in contact with the outer locking tab provides the second connection.

9. The connector assembly of claim 1, further comprising:
a guide wall integrally formed as part of and located inside the locking element; and
a shroud portion integrally formed as part of the connector housing, the aperture integrally formed as part of the shroud portion;
wherein the shroud portion is adjacent to the guide wall when the locking element is connected to the connector housing.

10. The connector assembly of claim 1, wherein the first connection is releasable.

11. The connector assembly of claim 1, wherein the second connection is permanent.

12. The connector assembly of claim 1, further comprising:
a circumferential flange integrally formed as part of the locking element; and
an inner circumferential flange integrally formed as part of the connector housing;
wherein damage to the circumferential flange or the inner circumferential flange provides an indication that the connector assembly has been tampered with.

13. A method directed to assembling a connector assembly, the method comprising:
providing a housing with an integral connector housing and an aperture integrally formed as part of the connector housing;
providing a wire assembly with a wire connector having a housing portion;
providing a locking element connected to the connector housing, the locking element having a cavity with a through-aperture integrally formed as part of the locking element;
placing the wire connector in a first position;
moving the wire connector through the through-aperture such that the wire connector moves through the locking element along a longitudinal axis;
rotating the wire connector to a second position;
connecting the wire connector to the connector housing by a first connection, by inserting the wire connector into the aperture;
inserting the connector housing into the cavity by moving the locking element towards the connector housing; and
connecting the locking element to the connector housing by a second connection.

* * * * *